United States Patent [19]

Tokarz

[11] 4,368,640

[45] Jan. 18, 1983

[54] LIQUID LEVEL SENSING DEVICE

[75] Inventor: Richard D. Tokarz, West Richland, Wash.

[73] Assignee: The United States of America as represented by the United States Department of Energy, Washington, D.C.

[21] Appl. No.: 229,424

[22] Filed: Jan. 29, 1981

[51] Int. Cl.³ ............................................. G01F 23/10
[52] U.S. Cl. ........................................ 73/311; 73/296; 73/309
[58] Field of Search ................ 73/296, 305, 309, 311, 73/313; 376/245, 250; 367/908; 181/124

[56] References Cited

U.S. PATENT DOCUMENTS 1,859,933  5/1932  Nikonow .............................. 73/309
2,791,907  5/1957  Guner et al. .......................... 73/309

FOREIGN PATENT DOCUMENTS 1061087  7/1959  Fed. Rep. of Germany ........ 73/311
553463   4/1977  U.S.S.R. ................................ 73/305

Primary Examiner—Howard A. Birmiel

[57] ABSTRACT

A liquid level sensing device comprising a load cell supporting a column or stack of segments freely resting on one another. The density of each element is substantially identical to that of the surrounding liquid. The elements are freely guided within a surrounding tube. As each element is exposed above the liquid level, its weight will be impressed through the column to the load cell, thereby providing a signal at the load cell directly proportional to the liquid level elevation.

12 Claims, 1 Drawing Figure

LIQUID LEVEL SENSING DEVICE

The United States government has rights in this invention pursuant to Contract No. EY-76-C-06-1830 between the U.S. Department of Energy and Battelle Memorial Institute.

BACKGROUND OF THE INVENTION

This disclosure relates to a device for sensing the elevation of a liquid level within a remotely monitored system such as a nuclear reactor.

This invention arose from tests requiring measurement of selected operational parameters within nuclear fuel bundles. It meets projected instrumentation requirements for development of liquid level measurements, which are crucial to monitoring the operation or the testing of pressurized water reactors, boiling water reactors and other types of reactors utilizing surrounding vessels containing a quantity of cooling liquid. Liquid level sensing is crucial in the conduct of tests simulating large, medium and small loss of coolant accidents in such reactors. To properly simulate such operating conditions, particularly small loss of coolant accidents, it is essential to provide test equipment having accurate means for sensing liquid level at any moment.

The described apparatus will provide liquid level information as a continuous readout so long as the very high temperatures that might result from such a test do not destroy the sensor itself. Even in this instance, some readout capability might be retained in the portion of the device which is not destroyed.

SUMMARY OF THE INVENTION

The disclosed device basically comprises a base which is fixed at a submerged location within a liquid filled enclosure. The base supports a weight responsive device, such as a load cell. Stacked above the load cell in contact with an active surface on it, are a plurality of segmented elements or rods. Surrounding the stack of elements is a guide tube that freely permits elevational shifting of the individual elements within the stack, but maintains them in an upright arrangement above the weight responsive device. Changes in the effective weight exerted on the weight responsive device will reflect changes in buoyancy of the elements throughout the stack, which in turn will be directly related to the liquid level elevation.

An object of this invention is to provide a simple liquid level sensing device which can be arranged within the limited confines of a nuclear fuel bundle or directly adjacent to it.

Another object of this invention is to provide a highly accurate liquid level sensing device with no mechanically interconnected parts.

Another object of this invention is to provide a device capable of functioning effectively under the very high temperatures and pressures and other enviornmental considerations present during normal and abnormal operation of a nuclear reactor.

DESCRIPTION OF THE DRAWING

The FIGURE is a fragmentary side elevation view of the apparatus, with the lower portion of it shown along a vertical central section line.

DESCRIPTION OF A PREFERRED EMBODIMENT

Figure 1:
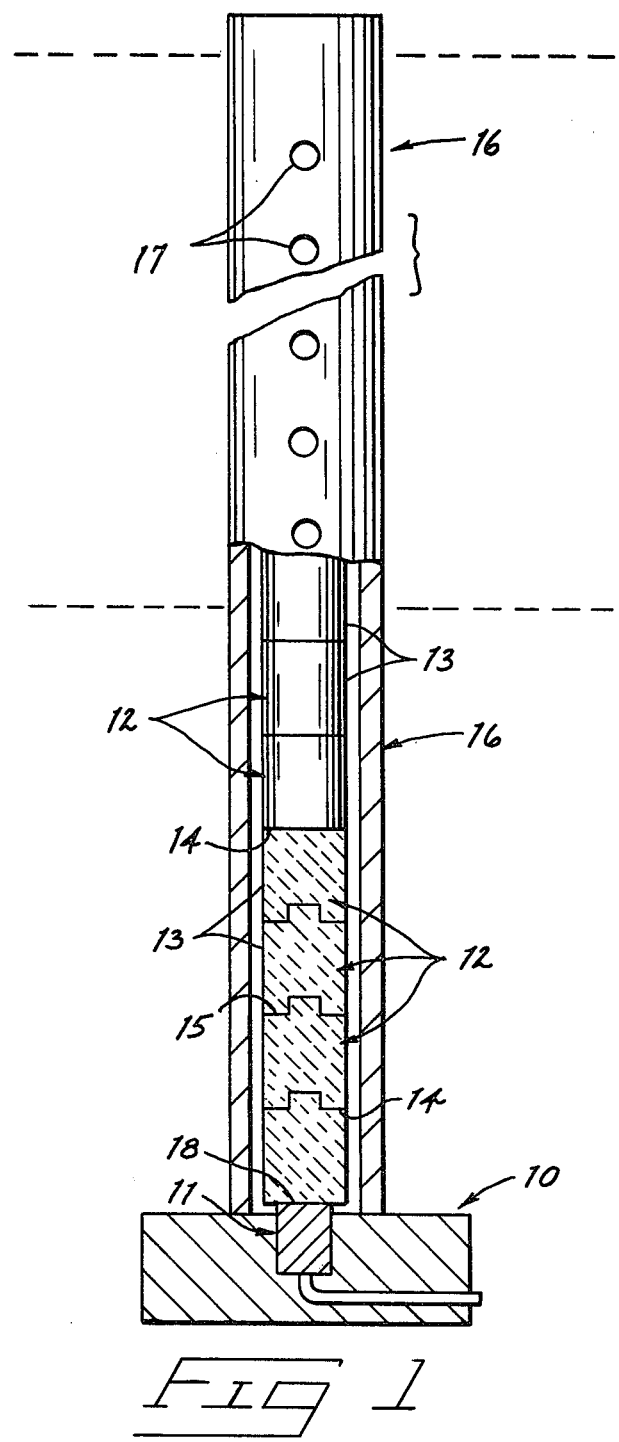

The drawing illustrates the basic arrangement of the apparatus for sensing liquid level in a vessel. It includes a structural base 10 which mounts a differential load cell 11 of conventional construction. The load cell 11 might take any physical form in which physical stress on one or more areas of the load cell are converted to electrical signals capable of remote processing. Such load cells are highly refined today and capable of distinguishing extremely small stress changes. As illustrated, the load cell 11 has a horizontal planar upper surface 18, which is the active surface of the load cell—the surface on which weight is measured by it.

Extending upwardly from base 10 is a vertical stack of segmented elements 12, shown as short lengths of a cylindrical rod. The length of each element 12 is a function of convenient fabrication. The width or diameter of each element is of no consequence except in relation to the sensitivity of the overall apparatus, as will be discussed below.

Each element 12 is shown as a short length of rod having cylindrical side walls 13 and parallel bottom and top surfaces 14 and 15. The stack of elements 12 is held in a vertical arrangement by guide means in the form of a surrounding guide tube 16. Tube 16 also is cylindrical and has an overall height equal to the elevation of the liquid level being monitored. It is provided with one or more rows of perforations 17 along its height to assure free liquid communication between the interior of the guide tube 16 and the interior of the liquid vessel within which the apparatus is used.

The stack of elements 12 fully cover the active surface at the top of load cell 11. Thus, no liquid head or other load is exerted on the load cell 11 beyond the weight of the elements 12 themselves. The static pressure in the vessel is not seen by the differential pressure transducer.

The elements 12 are preferably made of material such that their volume to weight ratio is substantially equivalent to the specific weight of the liquid they displace. In other words, their density is equal to that of the liquid. Therefore, as each element is submerged in the liquid, it will just barely float, removing its incremental weight from the total weight of the stack of elements 12 measured by the load cell 11. The sensitivity of load cell 11 should be selected to provide full scale deflection when the full weight of the column or stack of sensing elements 12 is resting on it. If all of the elements 12 are submerged, there will be no effective load on the load cell 11, thereby providing a maximum range of resulting signals from the load cell 11 for interpretative purposes.

The design of load cell 11 must be such that it senses only a definitive load on its active surface and not the liquid head in the vessel or the pressure head. This is within the skill of those designing load cells today.

Beginning with the situation in which the liquid level is at or above the top elevation of the guide tube 16, which includes the transverse upper wall limiting upward floatation of the elements 12, there will be no load sensed by the load cell 11. However, when the liquid level drops to uncover the uppermost element in the stack, its weight will be impressed on each element below it and therefore on the load cell 11. The remainder of the stack will have no excess buoyancy which would "float" all or part of the weight of the uncovered element. As liquid level continues to drop, each uncovered element 12 will add its weight to the weight of the total column.

Using water as a liquid medium, a one quarter inch outside diameter column eight feet high would experience a full scale readout from 0 to 0.5 lbs. The sensitivity of the device could be further increased by increasing the mass and volume of the elements 12.

One can adjust the specific weight of the elements 12 upwardly or downwardly somewhat from true balance with the density of the liquid. In most instances, it is desirable to have some slight load on the load cell 11 when the monitored vessel is full of liquid so as to provide a positive non-zero reading from the load cell 11. This would require that the buoyancy of the sensing elements be reduced slightly below the equilibrium condition.

One advantage of this arrangement is that the load cell itself is located at an elevationally low position, which might be at the bottom of a cooling liquid vessel. This would be the coolest point in the entire vessel or reactor, and the least likely position at which the load cell 11 would be injured or destroyed by elevated temperatures.

In nuclear reactor uses of the device, one practical material for construction of the elements 12 is a high temperature ceramic material, either foamed or otherwise formed with voids so as to provide a closed cell material with the required volume to weight ratio for use as described above. The guide tube 16 can be constructed from any suitable material, such as a high temperature ceramic material or high temperature alloy material that is inert to the surrounding liquid and potential gases in contact with it. Different applications of the apparatus could utilize many possible materials for construction of these elements.

Having described my invention, I claim:

1. A liquid level sensing device comprising:
a base adapted to be fixed at a submerged location within an enclosure containing a liquid;
weight responsive means on said base, said weight responsive means having an upwardly-facing active surface upon which the effective weight resting on it is monitored;
a plurality of independent segmented elements stacked upwardly one on another above and covering the upwardly facing active surface of the weight responsive means;
and a guide tube extending upward from said base for freely encircling and protecting the stacked elements and for locating their lowermost surface in contact with the active surface of said weight responsive means, whereby differences in the effective weight of the stack of elements due to flotation effects will be sensed by said weight responsive means.

2. A liquid level sensing device as claimed in claim 1 wherein the area of the lowermost surface of the stacked elements completely covers the area of the active surface of said weight responsive means.

3. A liquid level sensing device as claimed in claim 1 wherein the stacked elements are identical to one another and each has a constant cross-sectional configuration and size throughout its height between bottom and top parallel horizontal surfaces which are perpendicular to its side surfaces.

4. A liquid level sensing device as claimed in claim 1 wherein the density of each of said stacked elements is substantially equal to the density of the liquid within the enclosure.

5. A liquid level sensing device as claimed in claim 1 wherein said guide means is a perforated tube having upright inner walls complementary to the side walls of the stacked elements, the lower end of the tube being anchored to said base.

6. A liquid level sensing device as claimed in claim 1 wherein said guide tube is a cylindrical tube with holes along the side; said elements being substantially cylindrical in shape.

7. A liquid level sensing device as claimed in claim 1 wherein the cylindrical elements have a projection on the upper ends and corresponding recesses on lower ends for receiving the projection of the below adjacent elements.

8. A liquid level sensing device as claimed in claim 1 wherein said elements are constructed of high temperature resistant ceramic materials having a density substantially equal to the surrounding liquid.

9. A liquid level sensing device for monitoring liquid level along the vertical length of a fuel rod bundle in a nuclear reactor, comprising:
a base adapted to be fixed at a submerged location within a reactor vessel containing cooling liquid;
weight responsive means on said base, said weight responsive means having an upwardly-facing active surface upon which the effective weight resting on it is monitored;
a plurality of independent segmented elements stacked one upon the other above and covering the upwardly facing active surface of the weight responsive means;
and a guide tube loosely surrounding the stack of rods and fixed to said base, said tube being perforated along its length to permit free liquid flow between the reactor vessel and tube interior in response to changes in liquid level.

10. A liquid level sensing device as claimed in claim 9 wherein the weight responsive means is a load cell.

11. A liquid level sensing device as claimed in claim 9 wherein the segmented elements are fabricated from a closed cell ceramic material having a density substantially equal to the density of the cooling liquid.

12. A liquid level sensing device as claimed in claim 8 wherein the weight responsive means is a load cell; said guide tube and segmented elements being substantially cylindrical; and said segmented elements having projections on the upper end and corresponding recesses on the lower ends for receiving the projections of the below adjacent elements.

* * * * *